July 14, 1959 C. THUMIM 2,894,479
HAND WHEEL ASSEMBLY FOR BACK GAUGE OF PAPER CUTTERS
Filed May 24, 1957
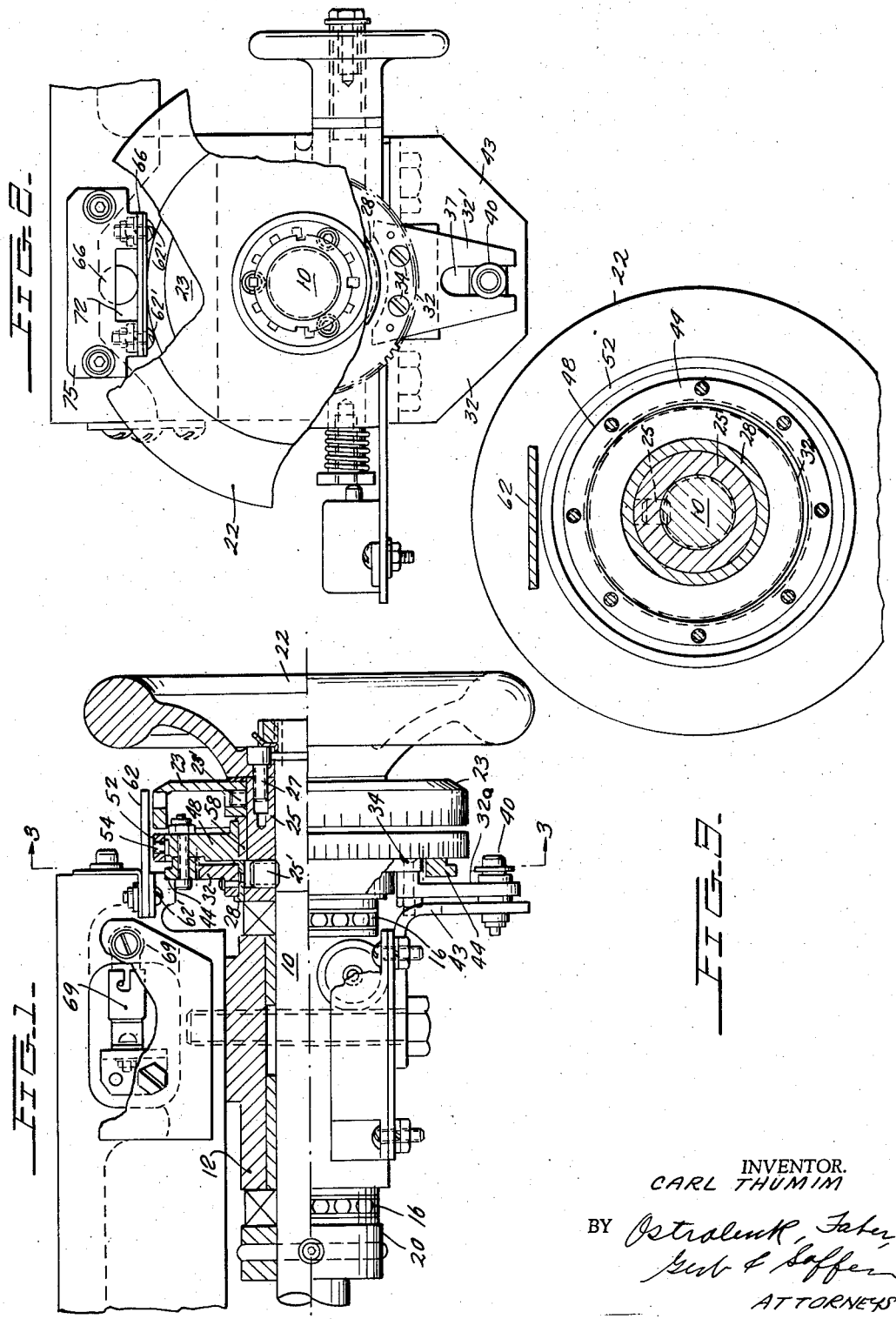
INVENTOR.
CARL THUMIM
BY Ostrolenk, Faber,
Gerb & Soffen
ATTORNEYS

2,894,479

HAND WHEEL ASSEMBLY FOR BACK GAUGE OF PAPER CUTTERS

Carl Thumim, Westbury, N.Y., assignor to E. P. Lawson Co. Inc., New York, N.Y., a corporation of New York Application May 24, 1957, Serial No. 661,533

3 Claims. (Cl. 116—115)

This invention relates to paper cutting machines and more particularly to a hand wheel for moving a back gauge of such machines.

It is an object of the invention to provide a hand powered back gauge assembly for setting the gauge precisely within a .001 accuracy.

It is another object of the invention to provide a back gauge hand wheel assembly of simple and economical construction without sacrificing any of the accuracy required in the operation of such a device.

It is another object of the invention to provide an assembly having improved visibility, including an illuminated dial.

It is still a further object of the invention to provide a hand wheel assembly calibrated in inches and fractions wherein the operator may know exactly where the back gauge is located by looking through a single window.

Other objects and features of the invention will be apparent from the detailed description to follow.

Briefly, my invention comprises an assembly wherein a hand wheel is attached to the lead screw of the back gauge, which hand wheel carries a drum dial calibrated in 64ths of an inch. The hand wheel is coupled through reduction gearing to a second drum dial calibrated to a scale of one inch. The two drum dials are coaxial and located next to each other so that they both rotate in unison and are visible through a transparent plate, being illuminated by an electric bulb suitably located with respect to the indicia.

A detailed description now follows with reference to the appended drawing in which:

Figure 1 is a longitudinal section; only a portion of the figure is shown in cross-section, on a median plane passing through the longitudinal axis of the device.

Figure 2 is an end view partially broken to show details;

Figure 3 is a section through 3—3 of Figure 1.

Referring now to the drawing, my invention comprises a lead screw 10 which will be understood to be suitably carried in a bearing 12 and having thrust bearings 16 intermediate thrust collars such as 20.

Suitably carried at the outer end of the lead screw is a hand wheel 22. A drum dial 23 graduated in 64ths of an inch is rotated with the hand wheel. A bushing 25 is keyed to the lead screw and the inner portion is an eccentric cam. The bushing 25 is keyed to the lead screw by a set screw 25' and carries the spacer bolt 27 for determining the position of the hand wheel. The drum dial 23 is carried on cam bushing 25 and keyed thereto as by a set screw 23'.

Movably but non-rotatively mounted on the cam bushing 25 is a gear 32, which gear has an extension fork 32a bolted to it as by bolts 34 and carrying a slot 37 which accommodates a bolt 40 fastened to the machine frame as by an angle bracket 43 and a bearing bushing 28. Thus, it will be apparent that as the hand wheel is rotated, bushing 25 and its cam rotate therewith effecting translatory movement of gear 32 without, however, rotating it. In other words, gear 32 moves bodily in a circular path without rotation about its own axis.

Surrounding gear 32 is an annulus gear or internal gear 44 which meshes with gear 32 and which has one more tooth than gear 32. Thus, for each full rotation of hand wheel 22, the internal gear will advance an angular distance of one tooth.

Bolted to the internal gear is a plate 48 which carries a drum dial 52 keyed to the plate 48 as by a set screw 54. The drum dial 52 is graduated in one inch spaces.

Support for the gear 44, plate 48, and drum dial 52 is on a bushing 58 rotatively carried on the sleeve 25.

From the foregoing description it will be apparent that rotation of the hand wheel carries drum dial 23 along therewith in unison while simultaneously effecting rotation of the drum dial 52 for an angular distance of one tooth. Thus, the indicia on the two dials will read inches and 64ths of an inch, visible through a transparent plate 62 bolted to the frame as by bolts 62' which will be understood to be provided with a suitable hair line. In order to provide illumination for the drum dials, a lamp 66 is provided in a socket 69 carried in any suitable manner by the machine frame. Rays from the light pass through an opening 72 in a front plate 75 in order to have access to the dials through the transparent plate.

Having thus described my invention, I am aware that various changes may be made without departing from the spirit thereof, and accordingly I do not seek to be limited to the precise illustration herein given except as set forth in the appended claims.

I claim:

1. In a hand wheel assembly for the back gauge of a paper cutting machine, a lead screw, a hand wheel secured to said lead screw, a drum dial secured to said lead screw and rotative with said hand wheel, a second drum dial coaxial with said first drum dial and positioned close thereto so as to be readable therewith, and means for rotating said second drum dial with rotation of said lead screw at a reduced angular rate, said means comprising a cam bushing carried by said lead screw, an external gear carried on said cam and disposed for nonrotary, translational motion upon rotation of said cam bushing, an internal gear meshing with said external gear and having an unequal number of teeth with respect thereto, said second drum dial being secured to said internal gear.

2. In a hand wheel assembly for the back gauge of a paper cutting machine, a lead screw, a hand wheel secured to said lead screw, a drum dial secured to said lead screw and rotative with said hand wheel, a second drum dial coaxial with said first drum dial and positioned close thereto so as to be readable therewith, and means for rotating said second drum dial with rotation of said lead screw at a reduced angular rate, said means comprising a cam bushing carried on said lead screw and keyed thereto, an external gear carried on said cam bushing, and restrained against rotative motion about its own axis but free to translate bodily about the axis of said lead screw, an internal gear surrounding said external gear and having one more tooth than said external gear and being meshed with said external gear, a supporting plate secured to said internal gear and being rotatively supported on said cam bushing, said second drum dial being carried on the periphery of said supporting plate.

3. In a hand wheel assembly as set forth in claim 2, means for restraining said external gear against rotative motion comprising a slotted element fixed to said external gear and carried thereby and a pin slidably engaging said element within said slot, and means for holding said pin stationary.

References Cited in the file of this patent

UNITED STATES PATENTS 2,753,834    Bourguignon _____ July 10, 1956